(No Model.)
H. E. MOON.
MAP AND CHART CASE.
No. 249,198. Patented Nov. 8, 1881.
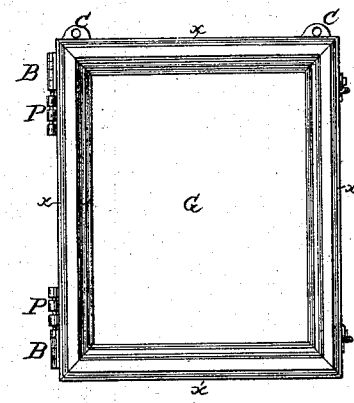
Fig. 1
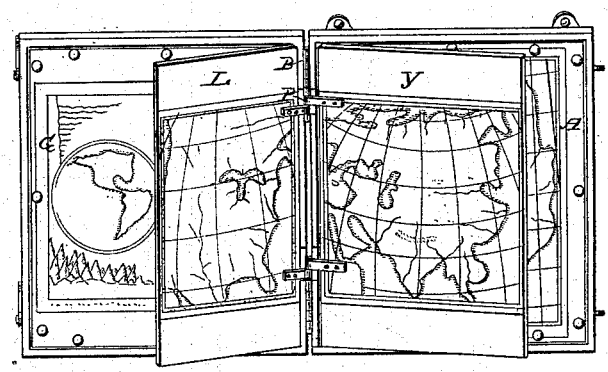
Fig. 2
Fig. 3
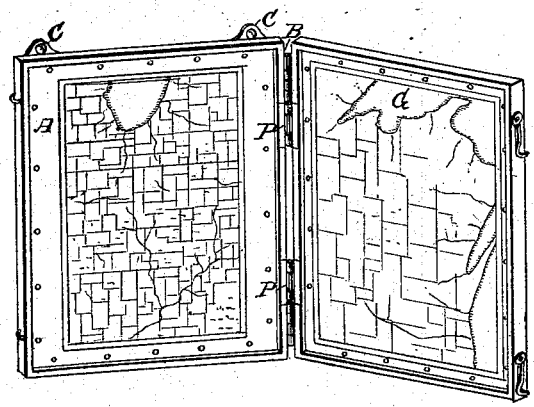
Fig. 4
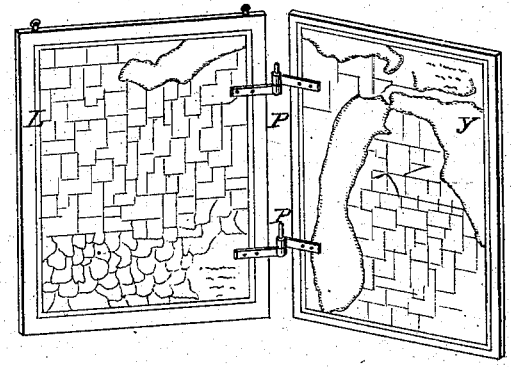
Witnesses:
Eli Stubbs
Ella Vosler
Inventor.
Hiram E. Moon

UNITED STATES PATENT OFFICE.

HIRAM E. MOON, OF RICHMOND, INDIANA.

MAP AND CHART CASE.

SPECIFICATION forming part of Letters Patent No. 249,198, dated November 8, 1881.

Application filed April 25, 1881. (No model.)

*To all whom it may concern:*

Be it known that I, HIRAM E. MOON, a citizen of the United States, residing at Richmond, in the county of Wayne and State of Indiana, have invented a new and useful Map and Chart Case or Cabinet, of which the following is a specification.

My invention relates to map and chart cases or cabinets in which a series of leaves or boards with maps, charts, &c., painted or pasted upon their surfaces are hinged to one common center, or have one common hinge-line, and susceptible of being folded or unfolded somewhat similar to a book, and having detachable leaves supported by hinges or pinned hinges attached to a rear stationary leaf.

The objects of my invention are, first, to provide means for the better preservation of maps, charts, &c., and to increase their utility and enlarge their usefulness by making them more accessible; second, to so construct a map cabinet or case as to so entirely exclude the light and dust from the contents within as to preserve the maps, charts, &c., as effectually as the leaves of a book, and also preserve their color without the use of varnish upon their surfaces; third, to provide a cabinet or case, so as to keep the maps, charts, &c., in a more compact form, of sufficient capacity to contain a sufficient number of maps or other matter to answer the purpose of schools, business-houses, &c., and which being placed in a conspicuous place can be seen from any and all parts of the room and at any angle without the obscurity arising from the reflection of light from varnished surfaces; fourth, to provide means by which the hinges are relieved of a part of the weight of the case; fifth, to so hinge or pivot the leaves that one or more of them may be readily detached from the case and from each other, and again replaced with ease and dispatch, and the whole closed and locked against light, dust, and intruders; sixth, to so construct the case or cabinet that it may be shipped in a finished condition to customers with leaves and hinges in place, avoiding the usual annoyance of putting together the parts; seventh, to so apply the rear and front leaves to recesses in the rear and front frames as to give them greater strength and durability, greater than obtained in the usual method of framing pictures; eighth, to so construct the case or cabinet that when closed it may appear more ornamental.

I attain these objects by the mechanism illustrated in the accompanying drawings, in which—

Figure 1 represents a front elevation of my map and chart case or cabinet closed, showing the moldings *x x x x* of the outer or front frame, surrounding and being permanently attached to the front pivoted leaf, G, the hinges B B and P P attached to the rear frame or leaf and supporting one or more pivoted leaves, the hangers C C secured to any part desired of the rear leaf or frame. Fig. 2 represents the rear leaf, A, made stationary, the front leaf, G, and the two inside leaves, L Y, open, showing the manner of attaching the hinges to the pivoted leaves L Y. Fig. 3 represents the rear stationary leaf in position with its moldings projecting beyond the rear leaf, A, for the reception of a part of the inside leaves, also the front frame and leaf, G, thrown back, showing also a rear projection of its outer molding beyond the leaf G for the reception of a part of the inside leaves when the case or cabinet is closed. Fig. 4 represents two of the inside leaves, L Y, detached from the case and having the leaf L firmly fixed to the wall by nails or otherwise, and the leaf Y hinged thereto, so it will fold when closed over the rear leaf.

In the further description of my invention similar letters represent similar parts.

In the construction of this case or cabinet any desired material may be used for the leaves that has sufficient stiffness or rigidity to enable them to support themselves properly, and tenacity and strength of material to support the hinges or strengthen the rear and front frames. The rear frame may be made of flat pieces of wood, with their edges fastened together with mortise and tenon, or mitered if desired, and have a wide, flat molding fastened to its outward edges, and made to project outward beyond its front face, forming a recess in which the leaf A is fitted by nailing firmly to rear frame or projecting molding, or both, for the purpose of giving to the frame greater strength. The outer or front frame may be constructed from regular picture-frame molding, with a flat back with similar molding fastened to its outer edges as that used around the rear frame, but projecting to the rear and forming a recess or chamber in which the leaf G is fitted and firmly fastened to the frame for the purpose of giving it the greatest possible strength. When desired these frames may be made of solid material, and the recess for the leaves A and G, and any inside leaves that may be added may be cut out of the solid material. Where two maps or charts only are required the molding need not project beyond the leaves A and G.

When it is desired to make the leaves of this map or chart case of three-ply veneers, it is found best in practice to have the grain of the inside veneer to run with the hinge-line of the leaves when mounted, and equal, or nearly so, in thickness to the sum of the outer veneers, and that the outer veneers should be glued to the middle veneer with their grain at or near right angles to it. In the construction of these leaves I am not confined to any particular material—sheet-iron, galvanized iron, or any stout substance, either metallic or otherwise, may be used.

The hinges B B may be pinned joint-hinges, pivoting the outer frame only to the rear frame, or it may be loose pin or joint hinge, enabling the operator to remove the outer frame and leaf, G, at pleasure; but the former method of hinging the outer leaf is preferable, as it enables us to secure all the contents of the case from intruders when locked, without a possibility of opening the case from the hinge-line by unhinging.

The hinges P P to the inside leaves may be made either loose joint or not, to suit customers, but preferably the former, as it enables the leaves to be used in different departments of schools, colleges, &c., and returned and replaced again to the case, with as much dispatch as papers and books. The hinges P P should be provided with flat strap-leaves, and riveted or fastened securely to the rear part of the inside leaves, letting them project backward through small slots or gains cut in the outside projections of the frames, and are hinged to the rear frame in line with the hinges B B.

If desired, all the pivoted leaves may be hung on one pair of hinges, or each pivoted leaf may be supported by its own hinges, always bearing in mind the necessity of hinging them all in the same line to prevent the chafing of the maps, charts, &c., which may be pasted to the surfaces of the leaves, which would be the result of hinging the leaves to different centers.

The maps, charts, or other matter may be pasted to the faces of the leaves, both inside and outside, of the case or cabinet in sheet form, without canvas, forming a more substantial back for the same, in which position they are never bent, chafed, or exposed to dirt and light only for a few moments, when in actual use, rendering the matter and the coloring almost as durable as the boards on which they are pasted and form a part. When desired, the faces of these leaves or boards may be covered with slating material or paint, and the whole or part of the case or cabinet may be used as a blackboard.

For the use of schools it is frequently desirable to mount all the inside leaves with outline maps, anatomical charts, &c., and to cover the outside front of the case or cabinet with slating material, forming a blackboard without the case and inclosing maps or charts within.

This case may be constructed by making the whole projection of the molding upon the rear stationary leaf, A, or upon the front leaf, G, and having the other leaves fold under; or the projecting molding, and the entire molding, in fact, that surround one or both of the outside leaves, may be omitted, and the rear leaf may be hung or nailed to the wall or support and the other leaves hinged to it, as at G A, Fig. 3. This construction should only be used where cheapness is desired.

The manner of operating this cabinet or case from the description above will be obvious to all. It opens and closes much like a large book, with one back nailed against the wall; but each leaf of a book, being pivoted to different center from the others, in opening produces a sliding motion, one leaf upon the other, which cannot result in opening the leaves of this map and chart case for the reasons stated.

I am aware that an album having a two-part case, said parts being hinged together and adapted to have their inclosing sides meet in edge-bearing, a series of album-leaves hinged on a common center in line with the hinged joint of the case, and a bracket provided with arms which suspend the case from its hinge-joints is old, and such construction I do not wish to be understood as claiming, broadly, as of my invention.

Having described my invention, what I claim therein as new, and desire to secure by Letters Patent, is—

1. The combination, in a map and chart case or cabinet, of a rear recessed frame, means by which said frame is suspended or secured in a stationary upright position, and a pivoted recessed frame secured to said stationary frame, said frames having leaves G A, permanently attached in the recessed portions thereof, and having maps, charts, or slating upon their surfaces, substantially as and for the purpose herein shown and described.

2. The combination, in a map and chart case or cabinet, of a rear recessed frame, means by which said frame is suspended in a stationary upright position, a pivoted recessed frame secured to the stationary frame, leaves G and A, permanently attached in the recessed portions of said frames, and intermediate pivoted leaves adapted to fold into said recessed frames, and having maps, charts, or slating upon their surfaces, substantially as and for the purpose herein shown and described.

3. The combination, in a map and chart case or cabinet, of a rear recessed frame, a pivoted front recessed frame secured thereto, and one or more intermediate independently-pivoted and detachable leaves, having maps, charts, or slating upon their surfaces, adapted to fold into said recessed frames, substantially as and for the purpose herein shown and described.

HIRAM E. MOON.

Witnesses:
ELI STUBBS,
SAMUEL B. ELLIS.